Aug. 14, 1962    M. L. BENJAMIN ET AL    3,049,033
SPADE DRILL AND GRINDING FIXTURE THEREFOR
Filed May 20, 1959    3 Sheets-Sheet 1
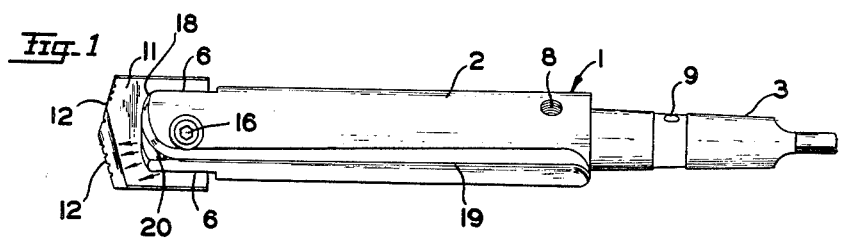
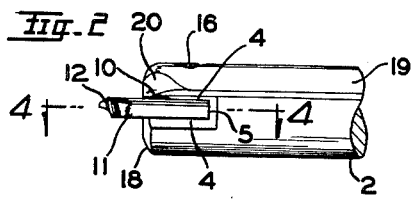
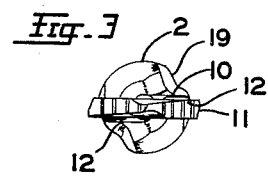
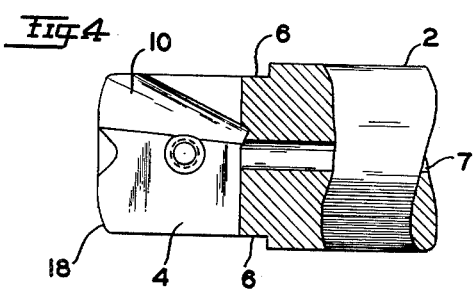
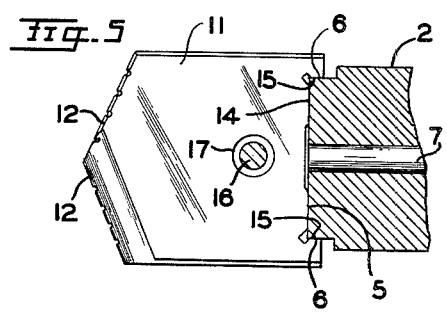
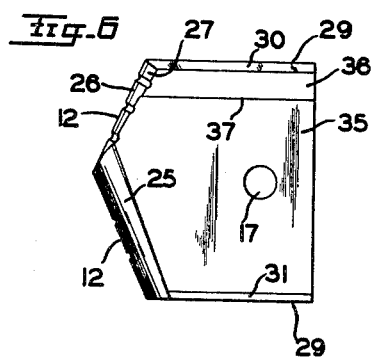
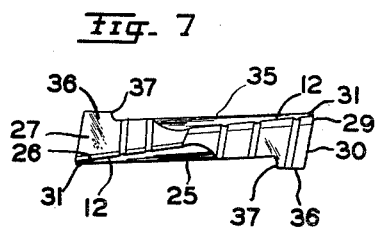
INVENTOR.
MILTON L. BENJAMIN
ELMER L.J. SYRENE
BY
Oberlin, Maky & Donnelly
ATTORNEYS

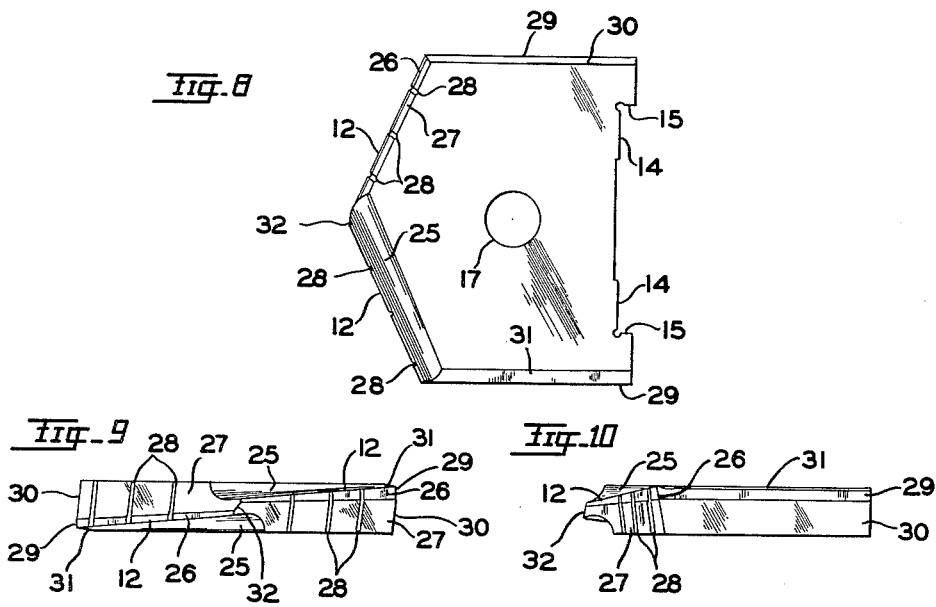
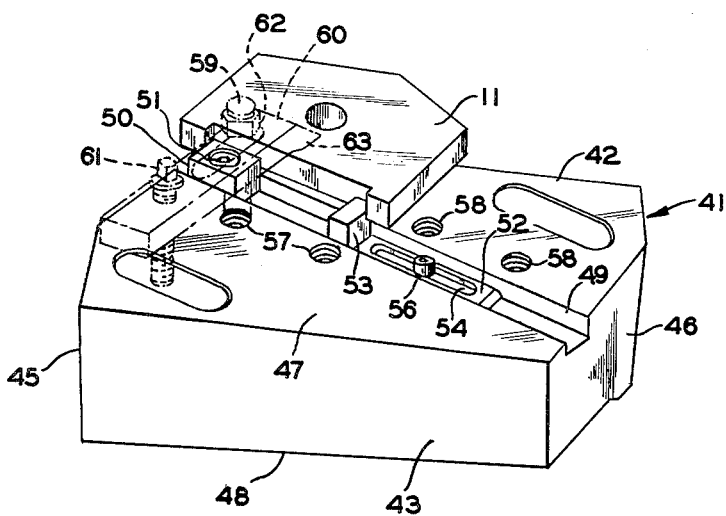

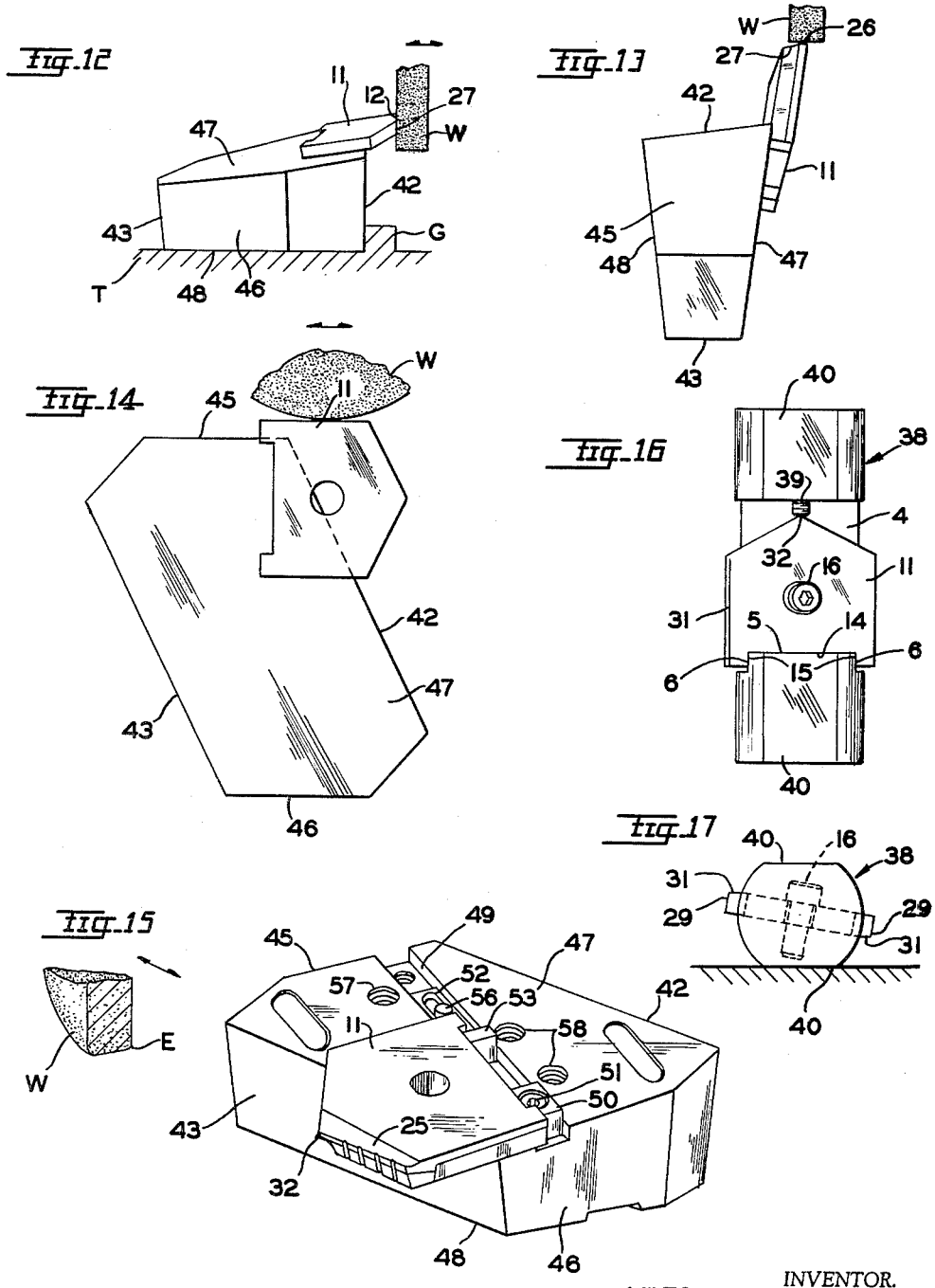

United States Patent Office 3,049,033
Patented Aug. 14, 1962

3,049,033
SPADE DRILL AND GRINDING FIXTURE THEREFOR
Milton L. Benjamin, Shaker Heights, and Elmer L. J. Syrene, Mentor, Ohio, assignors to Erickson Tool Company, Solon, Ohio, a corporation of Ohio
Filed May 20, 1959, Ser. No. 814,522
7 Claims. (Cl. 77—68)

The present invention relates generally as indicated to a spade drill and grinding fixture therefor and more particularly to certain improvements in the spade drill blade, in the blade-holder combination, and in the blade sharpening or regrinding fixture.

In general, it is well-known to provide so-called spade drills in which a blade is clamped in a holder and in which the holder is provided with passages for flow of coolant toward the cutting edges of the blade for cooling the blade and for flushing out the chips from the hole being drilled through flutes or flats formed on the opposite sides of the holder. It is also known in the art to provide various types of blade grinding or sharpening fixtures but, to our knowledge, all of such fixtures are designed to locate the blade from faces other than those used when the blade is mounted in the holder, thereby leading to inaccuracy in mounting and poor quality drilling action.

Accordingly, it is a main object of this invention to provide a novel form of spade drill blade, holder, and grinding fixture which results in much increased blade life, increased production (for example, the feed rate increased from 50% to 100% or more), elimination of binding or chattering in use, and economy and ease of duplication of factory-grade sharpness and accuracy in used reground blades.

It is another object of this invention to provide a spade drill in which the blade is securely and accurately mounted in the holder and in which the holder and the blade define therebetween thin and wide fan-shaped coolant passages for directing uniform thin and wide film-like streams of coolant toward the cutting edges of the blade to make most efficient use of the heat extracting properties of the coolant.

It is another object of this invention to provide a blade regrinding or sharpening fixture which is of very simple unitary construction and in which the blade to be reground or sharpened is accurately located in the fixture from the same surfaces as are used to locate the blade when mounted in the holder.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIGS. 1, 2, and 3, are, respectively, top plan, side elevation, and end elevation views of a spade drill embodying the present invention;

FIG. 4 is a cross-section view of the end of the holder (without the blade), such section having been taken substantially along the line 4—4, FIG. 2, on somewhat enlarged scale;

FIG. 5 is a view similar to FIG. 4 except showing how the blade is accurately and detachably mounted in the slotted end of the holder;

FIGS. 6 and 7 are top plan and end elevation views, respectively, of a modified form of spade drill blade having longitudinally extending and parallel locating ribs along opposite sides thereof by which the blade is adapted to be supported in coaxial relation to the holder therefor;

FIGS. 8, 9 and 10 are respectively top plan, end elevation, and side elevation views showing a preferred form of spade drill blade embodying the improvements herein;

FIGS. 11 to 15 show the novel grinding or sharpening fixture herein in several different positions for performing the several grinding or sharpening operations on a blade mounted thereon; and FIGS. 16 and 17 are top plan and end elevation views of a cylindrical grinding fixture.

THE SPADE DRILL

(a) The Holder

As best shown in FIGS. 1 to 5, the holder 1 comprises an elongated cylindrical body 2, and a shank 3 by which the holder is adapted to be held in a machine spindle, lathe turret or the like.

The end of the body 2 is formed with a slot extending diametrically thereacross formed with parallel sides 4 that are equidistant from the axis of the holder and with a flat bottom 5 which lies in a plane perpendicular to the axis of the holder. The slotted end of the holder is also formed with parallel flats 6 which are perpendicular to the opposite sides 4 and bottom 5 of the slot.

As shown, the holder 1 is formed with a central axially extending passage 7 which intersects the bottom 5 of the slot and terminates in radially extending passages 8 and 9 in the body 2 and in the shank 3 through which coolant is adapted to be supplied in well-known manner for flow through the passage 7 toward the slotted end of the holder. In the case of some tapered and all straight shank holders, such passage 7 may extend through the end of the shank.

The opposite sides 4 of the slot are formed with relatively thin and wide fan-shaped channels 10 which, as best shown in FIG. 4, intersect the central coolant passage 7 so that in use, with a blade 11 mounted in place, the coolant will emerge from such flat and wide channels 10 in the form of wide film-like streams whereby coolant will flow toward the cutting edges of the blade 11 in the manner indicated by the arrows in FIG. 1. By way of example, in a holder 1 for a 1¾″ wide blade 11 the depth of the channels 10 may be about ¹⁄₃₂″ and the width at the mouths thereof may be about ½″.

The blade 11 referred to has a pair of cutting edges 12 at its pointed cutting end and is recessed at its other end to provide relieved locating faces 14 and 15 that respectively abut and embrace the flat bottom 5 of the holder slot and the parallel flats 6. The blade 11 is of thickness to have a close fit between the parallel sides 4 of the holder slot. The blade 11 is held in place as by means of the screw 16, which, when tightened, draws together the spaced portions of the slotted portion of the holder 1 into firm frictional engagement with the opposite faces of the blade. It is to be noted that the blade 11 is formed with a hole 17 transversely therethrough which is of diameter substantially larger than the body of the screw 16 so that the blade 11 will be accurately located in a coaxial position in the holder 1 through the aforesaid locating surfaces.

The slotted end of the holder 1 has a beveled or rounded nose 18 and on opposite sides of the blade 11, the body 2 of the holder is formed with a pair of longitudinally extending flutes 19 which preferably are of progressively increasing depth from the slotted end toward the shank end whereby to prevent congestion of chips therein. Preferably, the front ends of the flutes 19 are relieved as at 20 to provide added space for easy entry and smooth flow of chips into the flutes 19.

In any case, it is to be observed that the wide and shallow fan-shaped channels 10 that are formed in the holder 1 define with the opposite plane faces of the blade 11, a pair of wide and thin passages for emergence of corresponding streams of coolant from the central passage 7 directed toward the respective cutting edges 12 of the blade 11 to thus effect efficient cooling action.

(b) The Spade Drill Blade

The blade 11, as best shown in FIGS. 8, 9, and 10, essentially comprises a flat body of suitable material which is formed with a pointed cutting end including the aforesaid cutting edges 12. Also, as aforesaid, the blade 11 is formed with a hole 17 transversely therethrough and with the locating faces 14 and 15 at the other end by which the blade may be securely and accurately mounted in a holder, such as the holder 1 previously referred to.

Preferably, the cutting edges 12 of the blade 11 will be formed with top rake grooves 25 and with primary and secondary relief surfaces 26 and 27. Also, the cutting end will be formed with chip breaker grooves 28 if these are found desirable or necessary.

The sides of the blade 11 are preferably "cylindrical ground" to provide cylindrical guide surfaces 29 which engage the side of the hole being drilled, such faces 29 being relieved as at 30.

The side edges 29 of the blade 11 are preferably formed with top relief 31 so that the outermost corners of the cutting edges 12 will be circumferentially advanced with respect to the cylinder-ground side edges 29, this having been found to be very important in preventing "heeling" action and in eliminating binding and chattering of the drill and in eliminating cutting action by such side edges 29.

A characterizing feature of the top rake 25 is that it is ground as with a plain cylindrical wheel that has a rounded corner whereby there is greater strength at each cutting edge 12 as compared with known grinding techniques in which radius wheels are employed to make the top rake grooves of concavely curved form. Also, the present blade 11 employs a straight cut in the forming of the top rake grooves 25 whereas, the present known technique involves using a 3° offset between the grinding wheel and the cutting edge when forming the top rake. The top rake grooves 25 herein are inclined toward the chisel edge 32 to reduce the web thickness to a minimum and thus enable easy penetration of the blade 11 into the work with light axial thrust loads. Because the radius of the rounded corner of the wheel is not critical herein, less frequent wheel dressing is required than in cases where the top rake grooves are of concavely curved form of prescribed radius.

Added strength may be imparted to the cutting edges 12 by leaving a slight flat (.010" for example) between the cutting edges 12 and the leading edges of the top rake grooves 25.

The blade 35 shown in FIGS. 6 and 7 is essentially the same as that shown in FIGS. 1 to 5, and 8 to 10, except that said FIGS. 6 and 7 blade is formed with longitudinally extending ribs 36 of which the inside faces 37 are adapted to engage the parallel flats 6 formed at the slotted end of the holder 1 and thus added rigidity is provided for holding the blade 35 in coaxial alignment with the holder 1.

THE CYLINDRICAL GRINDING FIXTURE

This fixture 38 as shown in FIGS. 16 and 17 generally resembles the holder 1 in that it is in the form of a bar provided with a flat face 4 against which the blade is clamped as by a screw 16, and with flat faces 5 and 6 engaging the faces 14 and 15 of the blade, the point 32 of the blade being engaged by an axially adjustable brass screw 39 or the like to hold the faces 14 and 5 in firm abutting engagement. With a blade thus held in the fixture it may be used in any conventional cylindrical grinder to grind the surfaces 29 along the opposite side edges of the blade 11. This fixture may also be formed with flat sides 40 on which it is adapted to be set to grind top relief 31 on each side of the blade 11, the surfaces 31 and 40 preferably being parallel as shown.

THE BLADE GRINDING OR SHARPENING FIXTURE (FIGS. 11 TO 15)

This fixture 41 basically comprises a solid block of metal which has front and rear faces 42 and 43, parallel and plane end faces 45 and 46 and top and bottom plane faces 47 and 48.

The top face 47 of the fixture 41 is formed with a diagonally disposed groove 49 adjacent one end or the other of which a block 50 is secured by the screw 51, said block 50 being of rectangular form so as to provide side and end faces that are perpendicular to each other and to top face 47. Also mounted in said groove 49 is the longitudinally adjustable bracket 52 which has an upstanding rectangular block portion 53 which likewise presents side and end faces that are perpendicular to each other and to the top face 47. Said bracket 52 is formed with a longitudinally extending slot 54 and is held in longitudinally adjusted position as by means of the screw 56 which has threaded engagement with the fixture 41. Another portion 53 may be provided at the other end of bracket 52 to avoid necessity of reversal as hereinafter explained.

The top face 47 of the fixture 41 is also formed with two pairs of threaded holes 57 and 58 disposed on opposite sides of the groove 49 to accommodate a screw post 59 for a clamping member 60, said clamping member 60 having a screw 61 threadedly engaged therewith to bear on the recessed top face 47 of the fixture. Thus, by manipulating the screw 61 and nut 62 the free end 63 of the clamping member 60 is brought to bear down on the blade 11. When the blade 11 is to be held on the upper left end of the fixture 41, as shown in FIG. 11, the clamping member 60 will be mounted in either threaded hole 57 according to the size of the blade 11.

(a) Grinding of Secondary Relief 27

To perform this operation on a blade 11, the latter is placed on the top face 47 of the fixture as shown in FIG. 11, the screw 56 for holding the adjustable bracket or slide 52 having been loosened so that the side and end of the block portion 53 thereof and the side and end of block 50 will engage the locating faces 14 and 15 of the blade 11 to be ground. With the slide 52 thus adjusted, the screw 56 is tightened and the screw 61 and nut 62 are manipulated to cause the clamping member 60 to clamp the blade 11 on the top face 47 of the fixture.

The blade 11 is thus supported in an inclined position with its edge 12 (see FIG. 12) disposed so that a vertical plane passing therethrough intersects a plane normal to the top face of the blade 11 at the required secondary relief angle of 14° for example. Such vertical plane through edge 12 will also be parallel to front face 42 and perpendicular to bottom face 48 whereby the secondary relief 27 may easily be ground by placing the bottom face 48 on a horizontal table T of a grinder and the front face 42 against a guide G on the table while, say, the flat vertical side of a grinding wheel W parallel to the guide, is moved against the end of the blade 11.

The groove 49 and front face 42 of the fixture are angularly related to provide the conventional point angle as used on spade drills, but if other point angles are desired, these may be easily achieved by performing the well-known sine bar calculations because the front face 42 of the fixture 41 is exactly 5" long. Thus, the blade 11 may be ground to best suit the materials of work pieces or for spot facing, counterboring or other operations.

(b) Grinding of Primary Relief 26

The primary relief 26 for the cutting edge 12, usually about 7°, for example, is obtained by turning the fixture 41 so that it rests on its rear face 43 on a horizontal support. In that case, the blade 11 will be tilted back, as shown in FIG. 13, to an angle of 7° so that relative horizontal movement of the wheel W and fixture will grind the horizontally disposed primary relief surface 26 which of course is inclined 7° with respect to the top surface of the blade 11.

(c) Grinding of Side Relief 30

The side relief 30 for the cylindrical grind 29 is obtained by placing the fixture 41 with its end face 46 resting on a horizontal support as in FIG. 14 whereby the blade 11 is tilted so that a horizontal plane passing through exposed side of the blade will be in a horizontal plane and at the required side relief angle with respect to a plane normal to the top face of the blade. Thus a wheel W moved horizontally as in FIG. 14 will grind the side relief 30.

The foregoing operations a, b, and c may then be repeated for the other cutting edge 12 and the other side of the blade by loosening the clamping member 60 and turning the blade 11 upside down.

(d) Grinding of Top Rake 25

To perform this operation the block 50 is mounted adjacent the other end of the fixture 41 as shown in FIG. 15, and the adjustable bracket 52 is turned end for end and adjusted so that it and the block 50 will engage the locating surfaces 14 and 15 of the blade 11 and, of course, the screw post 59 of the clamping member 60 will be mounted in one or the other of the threaded holes 58. With the blade 11 mounted as in FIG. 15, with its bottom face 48 resting on the horizontal table or surface plate or the like, of the grinder, all that it is necessary to do is to move the fixture 41 or the wheel W with its horizontal axis moving in a horizontal plane and its peripheral edge E radiused but without requiring precision forming of the radius on the wheel since the curved portion of the top rake groove 25 will function as a chip curler without providing any precise radius on the edge of the wheel W. In this case the blade is properly tilted to provide, not only the necessary top rake angle, but also a web thinning effect at the point 32. Because the portion of the top rake groove 25 adjacent to the cutting edge 12 is a plane surface rather than the conventional concave surface, the cutting edge 12 is greatly strengthened to the extent that double or triple feeds may be employed. For instance, the spade drill herein may be fed at the rate of .040" per revolution, as compared with the .015" to .020" per revolution when known grinding techniques are used.

(e) Grinding of the Top Cylindrical Grind Relief 31

While the fixture 41 herein does not make special provision for grinding the top relief 31 of the cylindrical grind 29, this can, of course, be done with the cylindrical grind fixture previously mentioned or other conventional holders wherein the grinding wheel axis and side 29 of the blade 11 are parallel.

SUMMARY

From the foregoing, it can be seen that the present invention provides a new form of spade drill comprising the holder 1 and blade 11, a new spade drill blade 11, and a new grinding fixture 41 for facilitating the accurate and easy grinding or sharpening of spade drill blades 11. As aforesaid, the effective coolant supply through the thin and wide fan shaped channels 10 to the cutting edges 12 of the blade under the chips curled by curling grooves 25, and the novel top rake grooves 25 provide for greatly enhanced life of the blade 11, together with quicker, more accurate drilling of smooth and round holes with greater rates of feed than currently are possible. Also, the top relief 31 of the side cylindrical grind 29 of the blade 11 positions the outer corners of the cutting edges 12 circumferentially ahead of the blade guide surfaces 29 so as to eliminate "heeling" action and to eliminate binding and cutting action by the sides of the blade.

In conclusion, several features of this invention contribute to greater accuracy in the drilling of holes in workpieces, much increased blade life, and much greater feeds (50% to 100% or more) at reduced horsepower.

It is to be understood that the blade guide surfaces 29 may be cylindrical-ground with conventional back-taper, for example, .001 inch/inch of length of the sides of the blade 11.

Other modes of applying the principle of the invention may be employed, change being made as regards the details described, provided the features stated in any of the following claims, or the equivalent of such, be employed.

We therefore particularly point out and distinctly claim as our invention:

1. A spade drill comprising a holder formed with an axial slot diametrically across one end; and a blade secured in said slot to provide a pair of cutting edges axially beyond the end of said holder, and parallel side faces to guide said drill in the hole formed by said cutting edges as said drill and a workpiece are relatively rotated and fed axially, said holder being formed with a coolant supply passage leading to the bottom of said slot, respective opposite side faces of said slot being formed with relatively shallow, generally fan-shaped channels that, at their narrow ends intersect such passage and that, at their wide ends open toward the respective cutting edges whereby to define with the juxtaposed faces of said blade a pair of fan-shaped passages wherefrom coolant is adapted to emerge as thin and wide streams to effectively cool said cutting edges.

2. The spade drill of claim 1 wherein said fan-shaped passages have centerlines that diverge from said coolant supply passage to thus direct such streams of coolant in direction generally normally to the lengths of said cutting edges.

3. A spade drill blade comprising a block having parallel top and bottom plane faces, a pointed cutting end, and parallel side faces, said cutting end being formed with a pair of cutting edges effective to drill a hole in a workpiece when said blade is rotated and fed axially against the workpiece, said side faces being cylindrical and being provided with top and trailing relieved surfaces, said top relief providing leading corners of obtuse angle to preclude cutting action thereby when the blade is in use as aforesaid.

4. A spade drill comprising a holder formed with an axial slot diametrically across one end; and a blade secured in said slot to provide a pair of cutting edges axially beyond the end of said holder, and parallel side faces to guide said drill in the hole formed by said cutting edges as said drill and workpiece are relatively rotated and fed axially, said blade being formed with top rake grooves constituted by plane surface portions adjoining the respective cutting edges and by concavely curved chip-curling terminal portions, such plane surface portions of said grooves commencing short axial distances from said cutting edges to leave minute flats thereadjacent that are disposed generally normal to the surface of revolution generated by said cutting edges by rotation of said drill about the longitudinal axis of said holder and blade.

5. A spade drill comprising a holder formed with an axial slot diametrically across one end; and a blade secured in said slot to provide a pair of cutting edges axially beyond the end of said holder, and parallel side faces to guide said drill in the hole formed by said cutting edges as said drill and a workpiece are relatively rotated and fed axially, said side faces being cylindrical and being relieved to provide leading corners of obtuse angle to preclude cutting action thereof when the drill is in use, the opposite sides of said blade being further relieved to leave relatively narrow side faces which substantially reduce binding action of the drill in the hole.

6. A spade drill blade comprising a block having parallel top and bottom plane faces, a pointed cutting end, and parallel side faces, said cutting end being formed with a pair of cutting edges effective to drill a hole in a workpiece when said blade is rotated and fed axially against the workpiece, said blade being formed with top rake grooves constituted by plane surface portions adjoining the respective cutting edges and by concavely curved chip-curling terminal portions, such plane surface portions of said grooves commencing short distances from said cutting edges to leave minute flats that are disposed essentially at zero rake angle with respect to the surface of revolution generated by said cutting edges by rotation of said blade as aforesaid.

7. A spade drill comprising a holder formed with an axial slot diametrically across one end, such slot extending between parallel flats formed at the slotted end thereof, a coolant supply passage leading to the bottom of said slot; and a blade secured in said slot to provide a pair of cutting edges beyond the end of said holder and parallel side faces to guide said drill in the hole formed by said cutting edges as said drill and a workpiece are relatively rotated and fed axially, said blade being formed with longitudinally extending oppositely directed ribs, the inside faces of which are adapted to engage the parallel flats formed at the slotted end of said holder to provide added rigidity in holding the blade in coaxial alignment with said holder.

References Cited in the file of this patent
UNITED STATES PATENTS

| | | |
|---|---|---|
| 1,746,046 | McIntosh | Feb. 4, 1930 |
| 2,400,856 | Thompson | May 21, 1946 |
| 2,418,021 | Fleischer | Mar. 25, 1947 |
| 2,730,849 | Novak | Jan. 17, 1956 |
| 2,816,464 | Willingham | Dec. 17, 1957 |
| 2,817,983 | Mossberg | Dec. 31, 1957 |
| 2,859,569 | Salmon | Nov. 11, 1958 |
| 2,936,658 | Riley | May 17, 1960 |

FOREIGN PATENTS

| | | |
|---|---|---|
| 230,307 | Switzerland | Mar. 16, 1944 |